106. COMPOSITIONS, COATING OR PLASTIC

82

Patented Feb. 16, 1943

2,311,271

UNITED STATES PATENT OFFICE 2,311,271

ADHESIVE

Willis C. Ware, Chicago, Ill., assignor, by mesne assignments, to Industrial Abrasives, Inc., Chicago, Ill., a corporation of Illinois No Drawing. Application November 9, 1938, Serial No. 239,603

2 Claims. (Cl. 106—82)

The present invention relates generally to adhesives. More particularly the invention relates to that type of adhesive which includes liquid silicate of soda as the base thereof and is designed primarily for use in bonding or uniting a coating of grit particles to a piece of flexible backing material in connection with the fabrication or manufacture of an abrasive element, such as a finishing or polishing disc.

One object of the invention is to provide an adhesive of this type which includes a body forming agent of aluminum silicate, silica, or magnesium silicate, and in which the base of liquid silicate of soda is a low ratio solution which chemically reacts with the body forming agent in such manner that the adhesive as a whole is more tenacious and better adapted for its intended purpose than previously designed adhesives of the same general character.

Another object of the invention is to provide an adhesive of the type under consideration which includes a wetting agent for surface tension reducing purposes and also includes a coloring agent which chemically reacts with the base forming low ratio silicate of soda solution so as to cause the adhesive to harden more quickly and the base solution to have greater water resisting characteristics.

A further object of the invention is to provide an adhesive of the type and character under consideration which includes a small amount of zinc oxide or like material for reducing the hydroscopic tendencies of the low ratio silicate of soda solution and increasing the toughness, hardness and heat resisting qualities of the mixture of silicate of soda and body forming agent.

A still further object of the invention is to provide an adhesive which has an extremely high melting point, may be manufactured at a low and reasonable cost, and, after setting, is extremely tough and slightly flexible.

Other objects of the invention and the various advantages and characteristics of the present adhesive will be apparent from a consideration of the following detailed description.

The adhesive which forms the subject matter of the invention has particular utility as a bonding or binding medium in connection with the fabrication of abrasive discs and like elements. It is of the so-called silicate of soda type and consists of a base of liquid silicate of soda, a body forming agent, a wetting agent, a toughening and hardening agent, and a coloring agent. The base is made of a low ratio silicate of soda solution so that there is a pronounced and comparatively quick chemical action between it and the body forming agent. In practice it has been found that a silicate of soda solution of approximately 60° Baumé and consisting of one part sodium oxide (Na₂O) and two parts silica (SiO₂) gives the adhesive the desired or proper degree of hardness. To obtain the proper or desired results there must be no more than two parts silica to one part sodium oxide. Aluminum silicate is preferably used as the body forming agent and when mixed, as hereinafter described, with the base, that is, the low ratio solution of silicate of soda, produces an extremely tough sticky mass. Instead of aluminum silicate, silica or magnesium silicate may be used as the body forming agent, inasmuch as such materials are chemically reactive with the low ratio solution of sodium silicate. The wetting agent is preferably sulphonated castor oil and serves to reduce the surface tension of the base solution. Instead of sulphonated castor oil, sodium or potassium oleate soap, or sodium or potassium ricinoleate soap may be used as the wetting agent. Zinc oxide or a like material such as calcium carbonate is used as the toughening and hardening agent. Such material in addition to adding toughness and hardness to the mixture of low ratio liquid silicate of soda and body forming agent serves to reduce the hydroscopic tendencies of the base. Raw or burnt umber or sienna is used as the coloring agent. By reason of the fact that these materials contain a very high percentage of manganese oxide and iron oxide the coloring agent as such reacts chemically with the mixture of low ratio silicate of soda and body forming agent and causes the adhesive as a whole to set more readily.

The base material, body forming agent, wetting agent, toughening and hardening agent, and coloring agent are preferably used in the following proportions:

| | Pounds |
|---|---|
| Base (low ratio silicate of soda solution) | 350 |
| Body forming agent (aluminum silicate, silica or magnesium silicate) | 100 |
| Wetting agent (sulphonated castor oil) | 1¾ |
| Toughening and hardening agent (zinc oxide or calcium carbonate) | 7 |
| Coloring agent (umber or sienna) | 25 |

In mixing the ingredients together in order to produce the adhesive the sulphonated castor oil, that is, the wetting agent, is first added to the low ratio solution of silicate of soda and the mixture of the two is stirred or thoroughly mixed together in any suitable agitating device. After the wetting agent has been thoroughly mixed with the base, the body forming agent is added and mixed with the other two ingredients. As a result of first mixing together the low ratio sodium silicate and the sulphonated castor oil, that is, the wetting agent, there is an efficient dispersion of the particles of body forming agent within the mixture of base and wetting agent when the said body forming agent is added to said mixture. Another advantage of adding the wetting agent to the base prior to mixing the body forming agent with the base is that when the body forming agent is added to the base the chemical action therebetween is materially hastened. After the body forming agent has been added to and mixed with the mixture of base and wetting agent zinc oxide is added and stirred into commingling relation with the mixture. The coloring agent is preferably not added to the mixture of base, wetting agent, body forming agent, and toughening and hardening agent until the adhesive is ready for use because it tends to effect substantially immediate setting of the final product. In order to obtain the desired results it is necessary that there be no more than a third as much body forming agent as base. By having three or more times as much base as body forming agent, the adhesive is capable of drying at normal atmospheric temperatures and in addition is sufficiently flexible when in its fully set condition to permit bending of the backing of the abrasive element with which it is employed. Furthermore, the adhesive is sufficiently fluid to penetrate the pores or interstices of the piece of flexible backing material and there is such a chemical reaction between the base and the body forming agent within the pores or interstices of the backing piece that the desired bonding or binding of the grit particles to the backing piece is obtained.

The adhesive when the mixture of all the ingredients thereof is complete is brown in color. If desired, water may be added to the adhesive in order to increase the latter's viscosity. In using the adhesive to secure a coating of grit to a piece of backing material in connection with the fabrication or manufacture of an abrasive element, the adhesive is spread in the form of a thin coat over the piece of backing material. Thereafter the grit particles are spread over the adhesive coating and the adhesive is permitted to set by air drying. After setting of the adhesive the grit particles are fixedly secured or attached to the adhesive backing material. The adhesive after setting thereof has a melting point of approximately 2600° F. Because of its high melting point and the fact that the ingredients are all inorganic the adhesive is heat resistant and will not decompose or soften under friction produced heat.

Whereas the adhesive has been described as having the ingredients thereof mixed together in certain proportions, it is to be understood that except where the proportions have been described as being critical other proportions than those specified may be used. It is also to be understood that the adhesive may be used for purposes other than bonding or uniting a coating of grit particles to a piece of backing material in connection with the fabrication of an adhesive element.

The present application is a continuation in part of an application for United States Letters Patent for improvements in adhesives, filed by me July 18, 1936, Serial No. 91,389.

Having thus described the invention, what I claim as new and desire to secure by Letters Patent is:

1. As a new composition of matter, a hard bonding heat resisting adhesive capable of setting at normal atmospheric temperatures and comprising substantially three hundred and fifty parts of a low ratio silicate of soda solution containing no more than two parts silica to one part sodium oxide, and an admixture of one and three quarters parts of sulphonated castor oil, one hundred parts of aluminum silicate, seven parts of zinc oxide, and twenty-five parts of a coloring agent selected from the group consisting of umber and sienna.

2. As a new composition of matter, a hard bonding heat resisting adhesive capable of setting at normal atmospheric temperatures and comprising substantially three hundred and fifty parts of a low ratio silicate of soda solution containing no more than two parts silica to one part sodium oxide, and an admixture of substantially one and three-quarters parts of a wetting agent capable of reducing surface tension of the solution, one hundred parts of a body forming agent selected from the group consisting of aluminum silicate, silica and magnesium silicate, seven parts of zinc oxide, and twenty-five parts of a coloring agent selected from the group consisting of umber and sienna.

WILLIS C. WARE.